US011918043B1

(12) United States Patent
Goradesky

(10) Patent No.: US 11,918,043 B1
(45) Date of Patent: Mar. 5, 2024

(54) PIPE WITH ADJUSTABLE CUTTING ELEMENT AND BOWL

(71) Applicant: Buddy Box, LLC, Weston, FL (US)

(72) Inventor: Harold Scot Goradesky, Plantation, FL (US)

(73) Assignee: Buddy Box, LLC, Weston, FL (US)

( * ) Notice: Subject to any disclaimer, the term of this patent is extended or adjusted under 35 U.S.C. 154(b) by 78 days.

(21) Appl. No.: 17/978,410

(22) Filed: Nov. 1, 2022

(51) Int. Cl.

| | |
|---|---|
| ***A24F 1/28*** | (2006.01) |
| ***A24F 3/00*** | (2006.01) |
| ***B26D 7/26*** | (2006.01) |
| ***A24B 7/00*** | (2006.01) |
| ***A24F 1/32*** | (2006.01) |
| ***A24F 5/00*** | (2006.01) |

(52) U.S. Cl.
CPC .................. *A24F 3/00* (2013.01); *A24B 7/00* (2013.01); *A24F 1/28* (2013.01); *A24F 1/32* (2013.01); *A24F 5/00* (2013.01); *B26D 7/2635* (2013.01)

(58) Field of Classification Search
CPC .... A24F 13/24; A24F 3/00; A24F 1/28; A24F 1/32; A24F 5/00
USPC ......................................... 131/248, 246, 233
See application file for complete search history.

(56) References Cited

U.S. PATENT DOCUMENTS

| | | | | |
|---|---|---|---|---|
| D167,231 S * | 7/1952 | Rehfeld | D27/163 | |
| 2,644,464 A * | 7/1953 | Lancaster | A24F 13/06 | 131/194 |
| D657,091 S * | 4/2012 | Braveman | D27/101 | |
| 8,813,758 B2 * | 8/2014 | Braveman | A24F 3/00 | 131/202 |
| 2002/0108624 A1 * | 8/2002 | Herrick | A24F 1/28 | 131/191 |
| 2009/0235939 A1 * | 9/2009 | Gonsalves | A24F 1/28 | 131/191 |
| 2016/0183589 A1 * | 6/2016 | Born et al. | A24F 1/32 | 131/191 |
| 2018/0360109 A1 * | 12/2018 | Nguyen et al. | A24F 13/18 | |
| 2019/0000139 A1 * | 1/2019 | Levine | A24F 1/28 | |
| 2020/0214340 A1 * | 7/2020 | Goradesky | A24F 13/22 | |
| 2021/0037882 A1 * | 2/2021 | Barenboym | A24D 3/04 | |
| 2022/0361561 A1 * | 11/2022 | Choe | A24F 1/32 | |

FOREIGN PATENT DOCUMENTS

WO WO2021/252996 * 12/2021

* cited by examiner

*Primary Examiner* — Dionne W. Mayes
(74) *Attorney, Agent, or Firm* — Christopher & Weisberg, P.A.

(57) ABSTRACT

The present invention provides a pipe having a bowl with a smoking material processing element. The bowl can be removable and replaceable with bowls of different sizes. The bowl and mouthpiece are more easily cleaned when separated than when combined. Further, the processing element can include cutting elements to prepare smoking material as part of the bowl loading process.

20 Claims, 3 Drawing Sheets

PIPE WITH ADJUSTABLE CUTTING ELEMENT AND BOWL

FIELD OF THE INVENTION

The invention relates to pipes for smoking materials such as tobacco and other plant matter.

BACKGROUND

Pipes for smoking plant matter (hereinafter "pipes") are well known and are found in many configurations. However, the essence of a pipe is a passage for a fluid (air, smoke, smoke or air entrained particulates) from one portion of the pipe where a chamber (or bowl) for burning plant matter is provided to an outlet where a user places their mouth to aspirate the fluid. Over time, the bowl can accrete residue form the burned plant matter and the residue or plant matter can clog the fluid passage. Thus, various pipe cleaning devices are known to scrape and remove residue from the bowl in addition to percussive motions or strikes.

While pipes are serviceable for smoking plant matter, they are not known and do not provide features to prepare the plant matter for introduction into the bowl and for smoking. Typically, plant matter such as tobacco products, are sold with the tobacco having been processed or manufactured to have specific size and shape portions of tobacco leaves. The user removes the processed leaves from a package or container and places a desired amount into the bowl. A pipe smoker selects a pipe having a bowl size as desired to accommodate a desired volume of tobacco.

Some smokers of other plant varieties use tobacco smoking oriented pipes or scaled down versions of them. However, other pipes have been developed for the specific plant or herbs to be smoked, sometimes in small quantities. For example, straight pipes resembling cigarettes are known, wherein a small bowl is at one end and a mouthpiece at the other. The user fills the bowl as desired with prepared material and smokes it like a cigarette, but with fewer "puffs." As with the larger tobacco pipes, the bowl is cleaned by percussion and/or the use of cleaning tools. Also, as with the larger tobacco pipes, the processing, preparation, or cutting to size of the smoking material is accomplished separately from the act of smoking with tools other than the pipe.

SUMMARY

The present invention provides a pipe having a bowl with a smoking material processing or cutting element. The bowl can be removable and replaceable with bowls of different sizes. The bowl and mouthpiece are more easily cleaned when separated than when combined. The cutting element prepares smoking material as part of a bowl loading process.

In an one embodiment a pipe includes a first body having a first end, a second end opposite the first end, an external surface, an internal surface, the internal surface defining a bore through the first body from the first end to the second end, the bore having a diameter; and a second body having a diameter that is less than the diameter of the bore, disposable within the bore, the second body defining a cavity with an aperture providing a fluid flow path from the first end to the second end of the first body.

The second body includes a cutting element that can extend beyond the first end of the first body. A locking element can secure the second body within the bore of the first body at a selected point between the first end and the second end of the first body.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
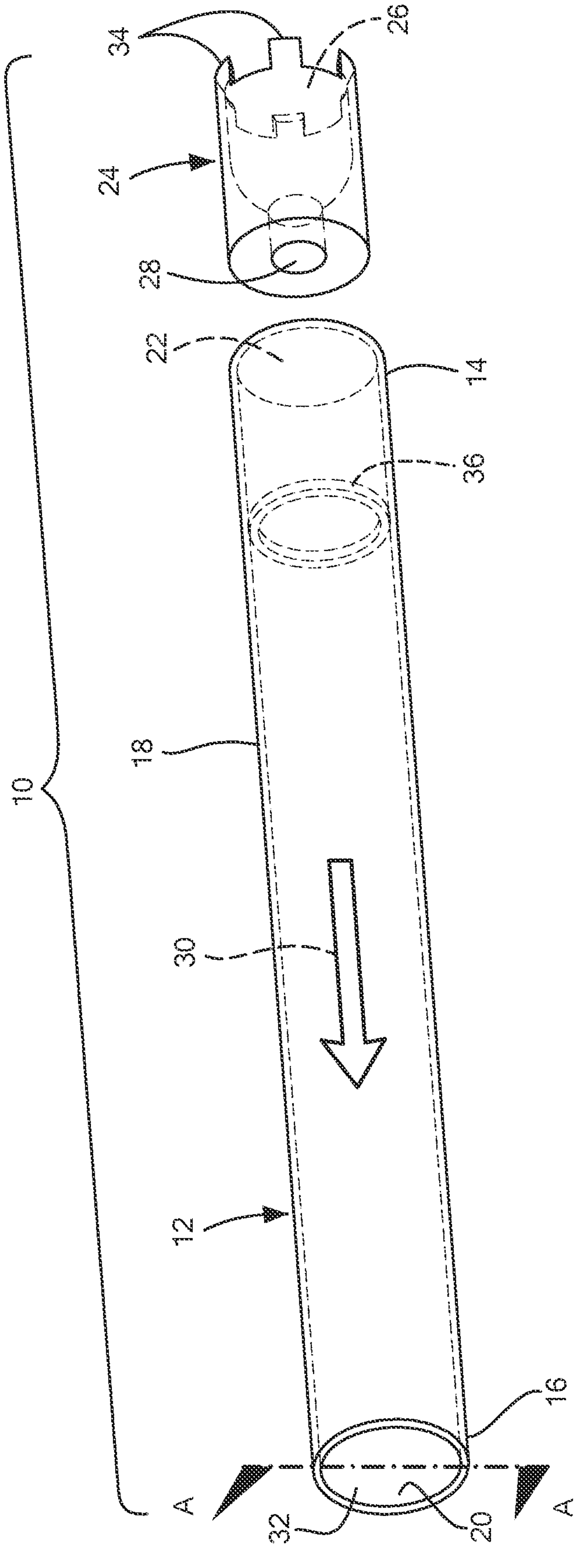
FIG. 1 illustrates a disassembled pipe in accordance with the invention.

FIG. 1 is an exploded/unassembled view of a pipe 10 for burning and inhaling smoking material. The pipe 10 includes a first body 12 having a first end 14, a second end 16 opposite the first end, an external surface 18, an internal surface 20, the internal surface defining a bore 22 through the first body from the first end to the second end, the bore having a diameter A second body 24 having a diameter that is less than the diameter of the bore 22 is disposable within the bore. The second body 24 defines a cavity or bowl 26 with an aperture 28 providing a fluid flow path 30 from the first end 14 to the second end 16 of the first body 12. The fluid flow path exit 32 is at the second end 16 of the first body 12.

Figure 2:
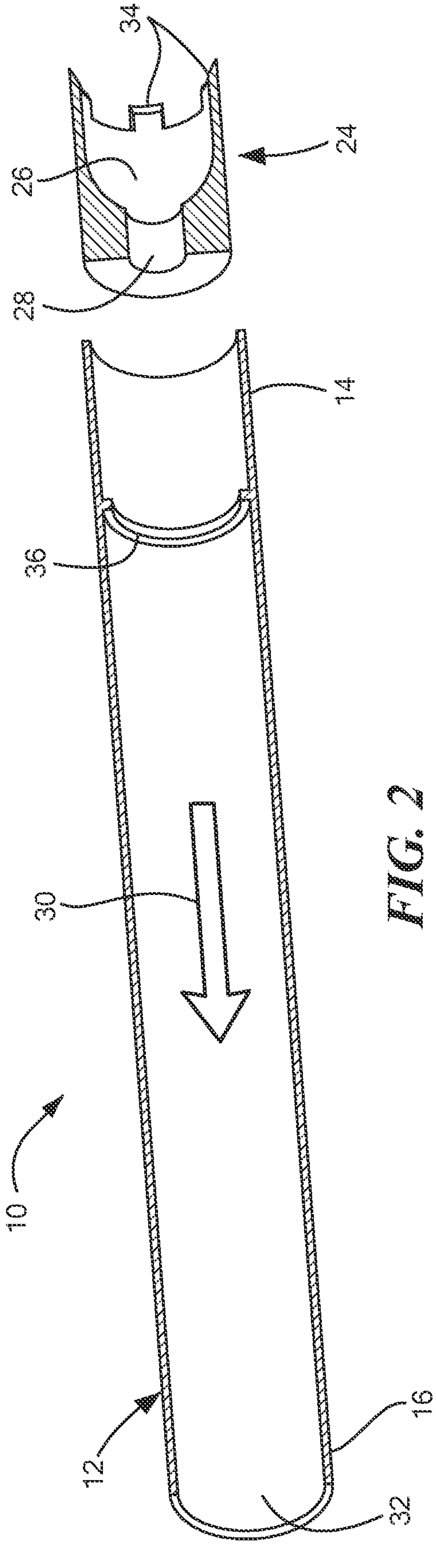
FIG. 2 illustrates a sectional view of the pipe of FIG. 1.
Figure 2A:
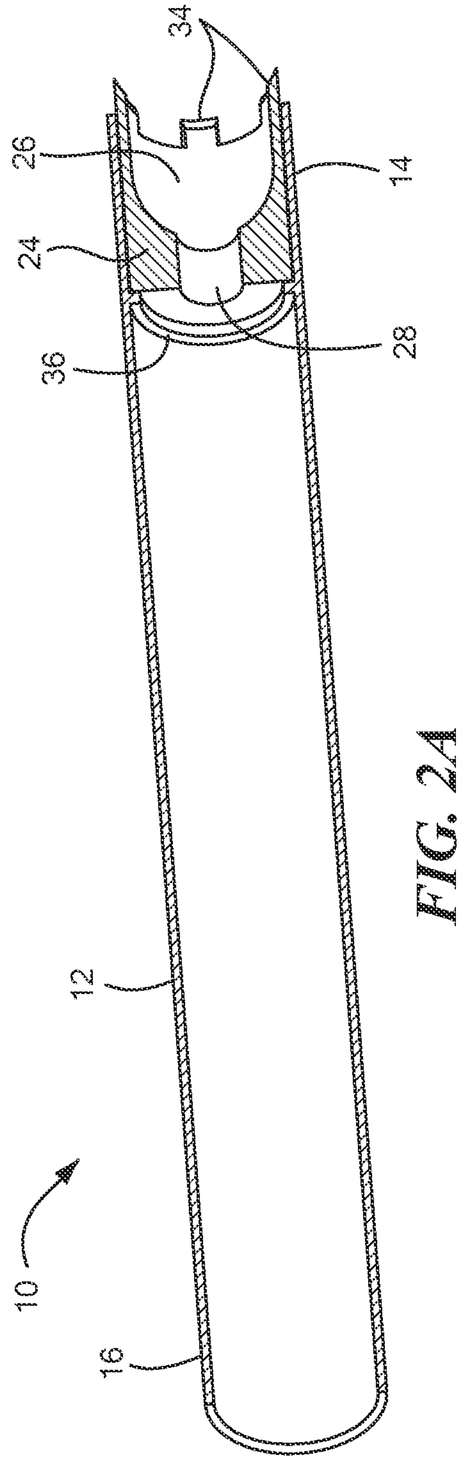
FIG. 2*a* is a sectional view of the pipe of FIG. 1 in an assembled state.

FIG. 2 shows the pipe 10 of FIG. 1 in sectional view along line A-A of FIG. 1, wherein the second body 24 is aligned for insertion into the bore 22 of the first body 12. FIG. 2*a* shows the second body 24 inserted into the bore 22. The first body 12 and the second body 24, and thus the pipe 10, are substantially cylindrical and axially aligned along the longitudinal axis of the pipe. However, the pipe 10 can be rectangular, hexagonal, etc. and ornamented as desired.

Continuing to refer to FIGS. 1, 2 and 2*a*, the second body 24 includes a cutting element 34. Depending upon how long the second body 24 is and/or how deeply it is inserted into the first end 14 of the first body 12, the cutting element extends in whole or in part from the first end 14 of the first body 12. As shown in FIGS. 1, 2 and 2*a*, there are multiple cutting elements 34 arranged in a circumferential, crenelated configuration.

One or more edges of the cutting element 34 can be sharp like a knife or razor blade so that cutting is accomplished with minimal force. Alternately, the one or more edges of the cutting element 34 can be dull so that cutting is accomplished with force (crushing and tearing). For safety reasons, the distal face of the blade or cutting element 34 can be dull whereas the sides can be sharp.

Regarding materials, the second body 24, can be made of a chemically nonreactive, heat-tolerant material like stainless steel. The first body 12 can also be made of similar or the same material in whole or in part, or it can be made of an insulative or less heat-conducting material such as a heat-tolerant plastic to make the pipe 10 more comfortable to hold with respect to thermal and tactical considerations. Further, the pipe can be mated to a filter and/or mouthpiece (not shown) at the second end 16 of the first body 12.

While the second body 24 can be inserted into the bore 22 of the first body 12 so that the cutting element 34 extends outwardly and or beyond the first end 14 of the first body, the second body can be removed and inserted into the bore 22 so that a rear portion of the second body faces outward or distally. This arrangement places the cutting element 34 in a protective location within the bore 20 so that the cutting element is not inadvertently damaged, and so that the cutting element does not cause unintended damage when not being used for its intended purpose described hereinbelow. Additionally, by facing the bowl 26 inward, residue, particulate, ash, and unburned smoking materials are covered/trapped within the pipe 10 to inhibit mess and odor. However, the second body 24 can be immovably joined to the first body 12 and not "reversible". Further, a second body 24 with or without cutting elements can be placed in the bore 22, wherein the bottom of the second body that defines the aperture 28 faces outward, but is disposed sufficiently far into the bore so that the bottom of the second body and the inner surface 20 define a bowl without teeth.

The bore 22 of the first body 12 can be tapered or stepped so that the bore is narrower at a selected point toward the second end 16 of the first body to provide friction fit, stop, lock or flange 36 to inhibit insertion depth of the second body 24 within the bore 22 of the first body 12, as well as to secure the second body 24 within the bore 22. The flange/lock 36 can include a first threaded region on the interior of the first body proximate the first end and a second threaded region on the exterior of the second body, wherein the first and second threaded regions are complementary (not shown).

Figure 3C:
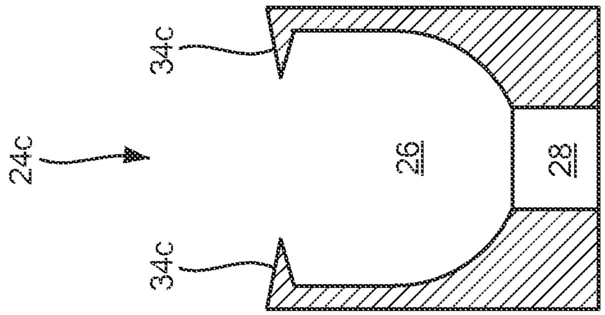
FIG. 3*c* depicts yet another embodiment of the bowl of FIG. 1.
Figure 3B:
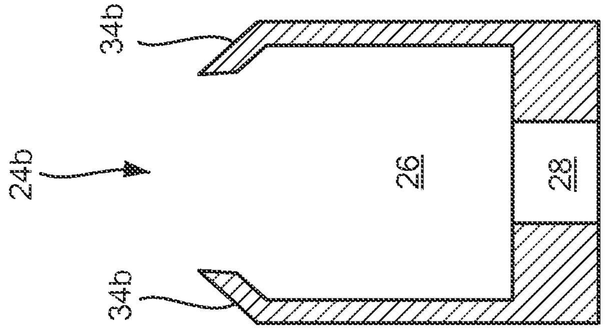
FIG. 3*b* depicts another embodiment of the bowl of FIG. 1.
Figure 3A:
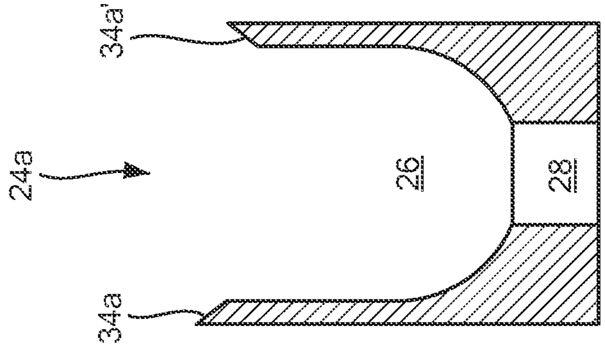
FIG. 3*a* depicts one embodiment of the bowl shown in FIG. 1.

Turning now to FIGS. 3*a*, 3*b* and 3*c* an exemplary set of second bodies 24*a*, 24*b* and 24*c* are shown. Each body can have a bowl 26 with a different shape, length, and volume. Additionally, each of the bodies can be provided with different cutting elements 34 or no cutting element. For example, second body 24*a* depicts two different size and shaped cutting elements 34*a* and 34*a*'. The second body 24*a* could be provided with one or more of each of these cutting elements, wherein each cutting element is the same or different depending upon the smoking material selected. While FIG. 3*a* depicts the cutting elements 34*a* and 34*a*' extending longitudinally from the second body 24*a*, FIG. 3*b* shows the cutting elements 34*b* angled over the bowl 26. FIG. 3*c* shows the cutting elements 34*c* in a planar configuration so that they do not extend beyond the plane of the bowl. The choice of second body 24 will thus be determined by the nature of the smoking material and the user's cutting or preparation preference.

In use, a user selects a second body 24 having desired volume and cutting element characteristics, and mates it with a first body 12 to create a pipe 10. The pipe 10 is inserted into a container of smoking material (not shown) and is pushed into the smoking material. The pipe 10 is rotated while gently pressing into the smoking material, thereby cutting/grinding the smoking material to a desired composition so that it can enter the bowl 34 of the pipe 10. The pipe 10 is then withdrawn from the container and is ready for smoking.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A pipe for burning and inhaling smoking material, comprising:

a first body having a first end, a second end opposite the first end, an external surface, an internal surface, the internal surface defining a bore through the first body from the first end to the second end, the bore having a diameter; and a second body having a first end, a second end opposite the first end with at least one cutting element on the second end, the second body including the at least one cutting element having a diameter that is less than the diameter of the bore, the second body being positionable within the bore at the first end of the first body, the second body defining a cavity with an aperture providing a fluid flow path from the first end to the second end of the first body, wherein when the second body is positioned within the bore, the at least one cutting element protrudes outwardly from the first end of the first body.

2. The pipe of claim 1, wherein the first body and the second body are cylindrical.

3. The pipe of claim 1, wherein the at least one cutting element on the second body includes a plurality of cutting elements.

4. The pipe of claim 3, wherein the plurality of cutting elements protrude outwardly from the second end of the second body.

5. The pipe of claim 3, wherein the plurality of cutting elements are arranged in a circumferential configuration around the second end of the second body.

6. The pipe of claim 4, wherein the plurality of cutting elements define a crenelated structure.

7. The pipe of claim 1, further comprising a locking element that secures the second body within the bore of the first body at a selected point between the first end and the second end of the first body.

8. The pipe of claim 7, wherein the locking element includes a first threaded region on the internal surface of the first body proximate the first end and a second threaded region on an external surface of the second body, wherein the first and second threaded regions are complementary.

9. The pipe of claim 1, further comprising a stop element that protrudes from the internal surface of the first body proximate the first end to inhibit passage of the second body through the bore toward the second end of the first body.

10. The pipe of claim 1, wherein the cavity defined by the second body has a volume and wherein the second body is selected from a group of bodies wherein the cavity defined in each body has a different volume.

11. The pipe of claim 1, wherein the second body has a length and wherein the second body is selected from a group of bodies wherein each body has a different length.

12. A pipe for burning and inhaling smoking material, comprising:

a first body having a first end, a second end opposite the first end, an external surface, an internal surface, the internal surface defining a bore through the first body from the first end to the second end, the bore having a diameter; and a second body having a first end, a second end opposite the first end with at least one cutting element on the second end, the second body including the at least one cutting element having a diameter that is less than the diameter of the bore, the second body being positionable within the bore at the first end of the first body, the second body defining a cavity wherein the cavity is a bowl with an aperture providing a fluid flow path from the first end to the second end of the first body, wherein when the second body is positioned within the bore, the at least one cutting element protrudes outwardly from the first end of the first body.

13. The pipe of claim 12, further comprising a locking element that secures the second body within the bore of the first body at a selected point between the first end and the second end of the first body.

14. The pipe of claim 13, wherein the at least one cutting element has a plurality of edges and at least one edge from the plurality of edges is sharp.

15. The pipe of claim 14, wherein the at least one cutting element includes a plurality of cutting elements.

16. The pipe of claim 15, wherein at least one edge from the plurality of edges further comprises a dull distal facing portion.

17. The pipe of claim 16, wherein the first body and the second body are substantially cylindrical and axially aligned.

18. The pipe of claim 17, wherein the second body is metallic.

19. The pipe of claim 18, wherein the first body includes an insulative material.

20. The pipe of claim 12, wherein the second body is selected from a group of second bodies each having a different cutting element and volume.

* * * * *